United States Patent
Skillen et al.

(10) Patent No.: US 8,645,351 B2
(45) Date of Patent: Feb. 4, 2014

(54) ASSOCIATIVE SEARCH ENGINE

(71) Applicant: Rockstar Consortium US LP, Plano, TX (US)

(72) Inventors: Richard Prescott Skillen, Mississauga (CA); Frederick Caldwell Livermore, Stittsville (CA)

(73) Assignee: Rockstar Consortium US LP, Plano, TX (US)

( * ) Notice: Subject to any disclaimer, the term of this patent is extended or adjusted under 35 U.S.C. 154(b) by 0 days.

(21) Appl. No.: 13/724,147

(22) Filed: Dec. 21, 2012

(65) Prior Publication Data

US 2013/0117116 A1    May 9, 2013

Related U.S. Application Data

(63) Continuation of application No. 13/031,478, filed on Feb. 21, 2011, which is a continuation of application No. 11/767,563, filed on Jun. 25, 2007, now Pat. No. 7,895,183, which is a continuation of application No. 09/351,747, filed on Jul. 8, 1999, now Pat. No. 7,236,969, which is a continuation of application No. 08/798,747, filed on Feb. 13, 1997, now Pat. No. 6,098,065.

(51) Int. Cl.
  *G06F 7/04*    (2006.01)
  *G06F 17/30*   (2006.01)

(52) U.S. Cl.
  USPC .......... 707/707; 707/759; 707/769; 707/706; 707/722

(58) Field of Classification Search
  None
  See application file for complete search history.

(56) References Cited

U.S. PATENT DOCUMENTS

| | | | |
|---|---|---|---|
| 5,241,671 | A | 8/1993 | Reed et al. |
| 5,265,065 | A | 11/1993 | Turtle |
| 5,283,731 | A | 2/1994 | Lalonde et al. |
| 5,515,098 | A | 5/1996 | Carles |
| 5,589,892 | A | 12/1996 | Knee et al. |
| 5,594,661 | A | 1/1997 | Bruner et al. |
| 5,659,732 | A | 8/1997 | Kirsch |
| 5,682,525 | A | 10/1997 | Bouve et al. |
| 5,694,594 | A | 12/1997 | Chang |
| 5,704,017 | A | 12/1997 | Heckerman et al. |
| 5,717,923 | A | 2/1998 | Dedrick |

(Continued)

FOREIGN PATENT DOCUMENTS

EP    0749081 A1    12/1996

OTHER PUBLICATIONS

"Fuzzy Database Language and Library—Fuzzy Extension to SQL," Nakajima, Hiroshi, Sogoh, Taiji, Arao, Masaki, Second IEEE International Conference on Fuzzy Systems, pp. 477-482, 1993.*

(Continued)

*Primary Examiner* — Bruce Moser
(74) *Attorney, Agent, or Firm* — Withrow & Terranova, PLLC

(57) ABSTRACT

This invention relates to an advertisement machine which provides advertisements to a user searching for desired information within a data network. The machine receives, from a user, a search request including a search argument corresponding to the desired information and searches, based upon the received search argument, a first database having data network related information to generate search results. It also correlates the received search argument to a particular advertisement in a second database having advertisement related information. The search results together with the particular advertisement are provided by the machine to the user.

19 Claims, 2 Drawing Sheets

(56) References Cited

U.S. PATENT DOCUMENTS

| | | | |
|---|---|---|---|
| 5,721,827 A | 2/1998 | Logan et al. | |
| 5,721,903 A | 2/1998 | Anand et al. | |
| 5,724,521 A | 3/1998 | Dedrick | |
| 5,727,129 A | 3/1998 | Barrett et al. | |
| 5,732,216 A | 3/1998 | Logan et al. | |
| 5,740,549 A * | 4/1998 | Reilly et al. | 705/14.42 |
| 5,745,882 A | 4/1998 | Bixler et al. | |
| 5,751,956 A | 5/1998 | Kirsch | |
| 5,754,939 A | 5/1998 | Herz et al. | |
| 5,778,362 A | 7/1998 | Deerwester | |
| 5,794,210 A | 8/1998 | Goldhaber et al. | |
| 5,848,396 A | 12/1998 | Gerace | |
| 5,860,068 A | 1/1999 | Cook | |
| 5,864,845 A | 1/1999 | Voorhees et al. | |
| 5,901,287 A | 5/1999 | Bull et al. | |
| 5,913,040 A | 6/1999 | Rakavy et al. | |
| 5,920,854 A | 7/1999 | Kirsch et al. | |
| 5,933,811 A | 8/1999 | Angles et al. | |
| 5,948,061 A | 9/1999 | Merriman et al. | |
| 5,974,409 A | 10/1999 | Sanu et al. | |
| 5,987,099 A | 11/1999 | O'Neill et al. | |
| 5,987,446 A | 11/1999 | Corey et al. | |
| 5,995,943 A | 11/1999 | Bull et al. | |
| 6,014,638 A | 1/2000 | Burge et al. | |
| 6,052,714 A | 4/2000 | Miike et al. | |
| 6,119,101 A | 9/2000 | Peckover | |
| 6,128,663 A | 10/2000 | Thomas | |
| 6,151,600 A * | 11/2000 | Dedrick | 1/1 |
| 6,173,045 B1 | 1/2001 | Smith | |
| 6,199,076 B1 | 3/2001 | Logan et al. | |
| 6,243,375 B1 | 6/2001 | Speicher | |
| 6,253,188 B1 | 6/2001 | Witek et al. | |
| 6,285,987 B1 | 9/2001 | Roth et al. | |
| 6,374,237 B1 | 4/2002 | Reese | |
| 6,397,228 B1 | 5/2002 | Lamburt et al. | |
| 6,463,431 B1 | 10/2002 | Schmitt | |
| 6,484,161 B1 | 11/2002 | Chipalkatti et al. | |
| 6,496,843 B1 | 12/2002 | Getchius et al. | |
| 6,639,608 B1 | 10/2003 | Itakura | |
| 6,650,998 B1 | 11/2003 | Rutledge et al. | |
| 7,013,478 B1 | 3/2006 | Hendricks et al. | |
| 7,225,142 B1 | 5/2007 | Apte et al. | |
| 7,236,969 B1 | 6/2007 | Skillen et al. | |
| 7,895,183 B2 | 2/2011 | Skillen et al. | |
| 7,945,553 B2 | 5/2011 | Skillen et al. | |
| 2012/0030199 A1 | 2/2012 | Mohajer | |
| 2012/0084151 A1 | 4/2012 | Kozak et al. | |
| 2012/0084349 A1 | 4/2012 | Lee | |

OTHER PUBLICATIONS

Anonymous, "Internet Access: Internet Marketing Revolution Begins in the US This September; Hyper System Promises New Cash Flow for Providers, Free Access for Users & a New Marketing Opportunity for Businesses," EDGE: Work-Group Computing Report, vol. 17, Jun. 1996, pp. 14-16.

Anonymous, "Make Sure Search Engines Find Your Site, Options Include Buying Words, Advertising, and Careful Page Design," PR News, vol. 52, No. 19, May 6, 1996, 515 words.

Kohda, Y. et al., "A New Advertising Business Framework in the 1:1 Marketing," Transactions of the Information Processing Society of Japan, Jun. 1996, vol. 37, No. 6, pp. 1235-1236.

Kohda, Y. et al., "Ubiquitous Advertising on the WWW: Merging Advertisement on the Browser," International World Wide Web Conference, May 6-10, 1996, published in Computer Networks and ISDN Systems, May 1996, vol. 28, No. 7-11, pp. 1493-1499.

Myaeng, S. H. et al., "Integration of User Profiles: Models and Experiments in Information Retrieval," Information Processing and Management, vol. 26, No. 6, 1990, pp. 719-738.

Schreiber, F.A. et al., "Dynamic User Profiles and Flexible Queries in Office Document Retrieval Systems," Decision Support Systems, Jan. 1, 1989, vol. 5, No. 1, pp. 13-28.

Non-final Office Action for U.S. Appl. No. 13/723,642 mailed Mar. 21, 2013, 13 pages.

Non-final Office Action for U.S. Appl. No. 13/724,076 mailed Apr. 9, 2013, 11 pages.

Notice of Allowance for U.S. Appl. No. 13/724,209 mailed Mar. 27, 2013, 8 pages.

Non-final Office Action for U.S. Appl. No. 13/724,495 mailed Apr. 1, 2013, 12 pages.

Non-final Office Action for U.S. Appl. No. 13/724,369 mailed Apr. 5, 2013, 15 pages.

Non-final Office Action for U.S. Appl. No. 13/723,670 mailed Mar. 21, 2013, 8 pages.

Non-final Office Action for U.S. Appl. No. 13/845,955 mailed Jun. 12, 2013, 23 pages.

Notice of Allowance for U.S. Appl. No. 13/031,478 mailed Jun. 7, 2013, 41 pages.

Lycos, Inc., "Quarterly Report Pursuant to Section 13 or 15(d) of the Securities Exchange Act of 1934: For the Quarterly period ended Oct. 31, 1996," Form 10-Q, filed Dec. 16, 1996, 15 pages.

Yahoo! Inc., "Annual Report Pursuant to Section 13 or 15(d) of the Securities Exchange Act of 1934: For the fiscal year ended Dec. 31, 1996," Form 10-K, filed Mar. 31, 1997, 284 pages.

Chavarria, G., "Information Retrieval Models Using Queries and User Profiles," 3rd International Conference on Computer Science, Jun. 20-24, 1983, pp. 113-130 (abstract only).

Yager, R.R, "Intelligent Agents on the World Wide Web," Workshop on Flexible Query—Answering Systems, May 22-24, 1996, pp. 289-306 (abstract only).

Final Office Action for U.S. Appl. No. 11/767,598, mailed Jun. 28, 2013, 13 pages.

Notice of Allowance for U.S. Appl. No. 13/724,209, mailed Jul. 2, 2013, 9 pages.

Non-Final Office Action for U.S. Appl. No. 13/031,478, mailed Sep. 6, 2013, 8 pages.

Notice of Allowance for U.S. Appl. No. 13/723,707, mailed Sep. 11, 2013, 11 pages.

Author Unknown, "AdWords Advantages," Google, 2004, adwords.google.com/select/advantages.html, U.S. Appl. No. 09/351,747, accessed Apr. 3, 2004, 2 pages.

Brin, et al., "The Anatomy of a Large-scale Hypertextual Web Search Engine," Computer Networks and ISDN Systems, 1998, 20 pages.

Chang, et al., "An agent-based Search Engine based on the Internet Search Service on the CORBA," International Symposium on Distributed Objects and Applications, 1999, pp. 26-33.

Deng, "Local Web Advertisement Through Dynamic Active Proxy," International Conference on Multimedia and Expo, Jul. 2000, pp. 1183-1186.

Author Unknown, "Surfin' DPLS!," DPLS News, Data and Program Library Service, University of Wisconsin-Madison, Oct. 1996, dpls.dacc.wisc.edu/pubs/Newsletters/oct96news.html, accessed Nov. 30, 2002, 6 pages.

Author Unknown, "Google," Wikipedia, http://en.wikipedia.org/wiki/Google_Inc., accessed Feb. 20, 2005, 9 pages.

Author Unknown, "Sergey Brin," Wikipedia, http://en.wikipedia.org/wiki/Sergey_Brin, accessed Feb. 20, 2005, 4 pages.

Gallagher, et al., "A Framework for Targeting Banner Advertising on the Internet," 13th Annual Hawaii International Conference on System Sciences, vol. 4, Jan. 7-10, 1997, pp. 265-274.

Gansing, "An Interview with Lev Manovich in Malmo," Malmo, Sweden, Aug. 2002, 9 pages.

Han, et al., "Data Mining for Web Intelligence," Computer, vol. 35, Iss. 11, Nov. 2002, pp. 64-70.

Sullivan, http://searchenginewatch.com/seraport/article.php/2205741, The Search Engine Report, No. 2, Dec. 22, 1996, 4 pages.

Sullivan, http://searchenginewatch.com/seraport/article.php/2205961, The Search Engine Report, No. 1, Jul. 23, 1996, 3 pages.

Sullivan, http://searchenginewatch.com/seraport/article.php/2205971, The Search Engine Report, No. 3, Jan. 31, 1997, 5 pages.

Hanpo et al., "A Comparative Study for Search Engine Business Model—Based on the case of Baidu and Google," International Conference on E-Business and E-Government, May 2010, pp. 228-232.

Handley, "Interview in ClickZ with Glenn Fleischman," The ClickZ Letter, Sep. 18, 1997, Issue 3, 15 pages.

(56) References Cited

OTHER PUBLICATIONS

Kohli, et al., "Evolution of Interdependency Model based on Behavioral Analysis of User, Search Engine, and Advertiser in Online Advertising," Fourth International Conference on Innovations in Information Technology, Nov. 2007, pp. 213-217.
Layton, "How Amazon Works," Howstuffworks, 2008, http://money.howstuffworks.com/amazon.htm, accessed Mar. 23, 2008, 5 pages.
Lee, et al., "Hybrid gateway advertisement scheme for connecting mobile ad hoc networks to the Internet," 57th Semiannual Vehicular Technology Conference, Apr. 2003, pp. 191-195.
Lee, et al., "Research on the Advertisement Effect of Push Type Mobile Advertisement," Fourth International Conference on Cooperation and Promotion of Information Resources in Science and Technology, Nov. 2009, pp. 137-142.
Li, et al. "On Detection of Advertising Images," International Conference on Multimedia and Expo, Jul. 2007, pp. 1758-1761.
Mauldin, "Lycos: Design choices in an Internet search service," IEEE Expert, Institute of Electrical and Electronics Engineers, Inc., Jan. 1997, 7 pages.
Marchiori, "The Quest for Correct Information on the Web: Hyper Search Engines," Computer Networks and ISDN Systems, vol. 29, Sep. 1997, pp. 1225-1236.
Nakajima et al., "Fuzzy Database Language and Library—Fuzzy Extension to SQL," Second IEEE International Conference on Fuzzy Systems, presented Mar. 28-Apr. 1, 1993, pp. 477-482.
Author Unknown, "Global E-Commerce: North America—Early History," Net Industries, 2008, http://ecommerce.hostip.info/pages/501/Global-E-Commerce-North-America-EARLY-HISTORY.html, accessed Mar. 23, 2008, 5 pages.
Ng et al., "An Intelligent Agent for Web Advertisements," Third International Symposium on Cooperative Database Systems for Advanced Applications, Apr. 2001, pp. 102-109.
Opfer, "The History of the Internet According to Itself: A Synthesis of Online Internet Histories Available at the Turn of the Century," http://members.cox.net.opfer/index.html, Dec. 11, 1999, 64 pages.
Sato et al., "Distributed Information Retrieval by using Cooperative Meta Search Engines," Distributed Computing Systems Workshops, Apr. 2001, pp. 345-350.
Shen et al., "A Meta-search Method Reinforced by Cluster Descriptors," Second International Conference on Web Information Systems Engineering, Dec. 2001, vol. 1, pp. 125-132.
Spertus, "ParaSite: Mining Structural Information on the Web," The Sixth International World Wide Web Conference, Apr. 1997, 13 pages.
Spink, et al., "Overlap Among Major Web Search Engines," Third International Conference on Technology: New Generations, Apr. 2006, pp. 370-374.
Uehara, "Change Aware Distributed File System for a Distributed Search Engine," IEEE International Conference on Multimedia and Expo, Jun. 2004, vol. 3, pp. 1511-1514.
Winterton, "E-Commerce," Webtrospecticus: A Very Brief History of the Internet, 1996, http://webtrospecticus.com/1996-ecommerce.htm, accessed Mar. 23, 2008, 1 page.
Final Office Action for U.S. Appl. No. 11/767,598 mailed May 14, 2012, 14 pages.
Non-final Office Action for U.S. Appl. No. 11/767,598 mailed Nov. 2, 2011, 13 pages.
Final Office Action for U.S. Appl. No. 11/767,598 mailed Feb. 24, 2010, 12 pages.
Non-final Office Action for U.S. Appl. No. 11/767,598 mailed Aug. 27, 2009, 10 pages.
Notice of Allowance for U.S. Appl. No. 13/031,478 mailed Jul. 19, 2012, 7 pages.
Non-final Office Action for U.S. Appl. No. 13/031,478 mailed Feb. 2, 2012, 7 pages.
Notice of Allowance for U.S. Appl. No. 13/031,478 mailed Nov. 14, 2011, 7 pages.
Non-final Office Action for U.S. Appl. No. 13/031,478 mailed Jun. 28, 2011, 6 pages.
Notice of Allowance for U.S. Appl. No. 13/031,478 mailed Dec. 6, 2012, 8 pages.
Notice of Allowance for U.S. Appl. No. 09/351,747 mailed Feb. 23, 2007, 7 pages.
Non-final Office Action for U.S. Appl. No. 09/351,747 mailed Feb. 28, 2005, 8 pages.
Non-final Office Action for U.S. Appl. No. 09/351,747 mailed Apr. 6, 2004, 6 pages.
Non-final Office Action for U.S. Appl. No. 09/351,747 mailed Jun. 11, 2003, 8 pages.
Non-final Office Action for U.S. Appl. No. 09/351,747 mailed Dec. 3, 2002, 8 pages.
Notice of Allowance for U.S. Appl. No. 11/767,584 mailed Dec. 28, 2010, 8 pages.
Non-final Office Action for U.S. Appl. No. 11/767,584 mailed Jun. 30, 2010, 10 pages.
Final Office Action for U.S. Appl. No. 11/767,584 mailed Jan. 11, 2010, 11 pages.
Non-final Office Action for U.S. Appl. No. 11/767,584 mailed Jun. 24, 2009, 9 pages.
Notice of Allowance for U.S. Appl. No. 11/767,563 mailed Nov. 3, 2010, 7 pages.
Non-final Office Action for U.S. Appl. No. 11/767,563 mailed Jul. 21, 2010, 13 pages.
Notice of Allowance for U.S. Appl. No. 11/767,632 mailed Jan. 27, 2011, 7 pages.
Non-final Office Action for U.S. Appl. No. 11/767,632 mailed Jul. 1, 2010, 11 pages.
Final Office Action for U.S. Appl. No. 11/767,632 mailed Jan. 11, 2010. 10 pages.
Non-final Office Action for U.S. Appl. No. 11/767,632 mailed Jun. 22, 2009, 7 pages.
Notice of Allowance for U.S. Appl. No. 12/418,386 mailed Mar. 18, 2011, 9 pages.
Non-final Office Action for U.S. Appl. No. 12/418,386 mailed Sep. 17, 2010, 12 pages.
Notice of Allowance for U.S. Appl. No. 11/767,569 mailed Sep. 21, 2009, 7 pages.
Non-final Office Action for U.S. Appl. No. 11/767,569 mailed Mar. 3, 2009, 7 pages.
Final Office Action for U.S. Appl. No. 11/767,569 mailed Sep. 25, 2008, 7 pages.
Non-final Office Action for U.S. Appl. No. 11/767,569 mailed Feb. 25, 2008, 12 pages.
Notice of Allowance for U.S. Appl. No. 11/767,650 mailed Oct. 22, 2008, 6 pages.
Non-final Office Action for U.S. Appl. No. 11/767,650 mailed Mar. 27, 2008, 12 pages.
International Search Report for PCT/CA98/00086 mailed Apr. 28, 1998, 4 pages.
Non-final Office Action for U.S. Appl. No. 13/723,707 mailed Feb. 25, 2013, 15 pages.
Non-final Office Action for U.S. Appl. No. 13/724,032 mailed Mar. 8, 2013, 12 pages.
Notice of Allowance for U.S. Appl. No. 13/724,032, mailed Sep. 25, 2013, 11 pages.
Final Office Action for U.S. Appl. No. 13/723,642, mailed Oct. 9, 2013, 19 pages.
Final Office Action for U.S. Appl. No. 13/723,670, mailed Oct. 9, 2013, 14 pages.
Final Office Action for U.S. Appl. No. 13/724,495, mailed Oct. 15, 2013, 14 pages.
Final Office Action for U.S. Appl. No. 13/724,369, mailed Oct. 29, 2013, 17 pages.
Final Office Action for U.S. Appl. No. 13/724,076, mailed Oct. 22, 2013, 16 pages.
Fukushima, S. et al., "Improved Retrieval in a Fuzzy Database from Adjusted User Input," Journal of Intelligent Information Systems, Copyright: 1995, 26 pages.
Kamba, Tomonari et al., "The Krakatoa Chronicle—An Interactive, Personalized, Newspaper on the Web," W3.org, 12 pages, www.w3.org/Conferences/WWW4/Papers/93/, 1995.

* cited by examiner

ASSOCIATIVE SEARCH ENGINE

CROSS REFERENCE TO RELATED PATENTS/PATENT APPLICATIONS

Continuation Priority Claim, 35 U.S.C. §120

The present U.S. Utility Patent Application claims priority pursuant to 35 U.S.C. §120, as a continuation, to U.S. Utility patent application Ser. No. 13/031,478, filed Feb. 21, 2011, which is a continuation of U.S. Utility patent application Ser. No. 11/767,563, filed Jun. 25, 2007, now issued as U.S. Utility Pat. No. 7,895,183, which is a continuation of U.S. Utility patent application Ser. No. 09/351,747, filed Jul. 8, 1999, now issued as U.S. Utility Pat. No. 7,236,969, which is a continuation of U.S. Utility patent application Ser. No. 08/798,747, filed Feb. 13, 1997, now issued as U.S. Utility Pat. No. 6,098,065, the contents of which are hereby incorporated herein by reference in their entirety and made part of the present U.S. Utility Patent Application for all purposes.

BACKGROUND OF THE INVENTION

The invention generally relates to search engines and, in particular, to an associative search methodology, based on a contextual search engine, for retrieving related information.

The Internet provides an excellent vehicle for access to information about goods and services on a global basis. In theory, anyone can access information about any product. In practice, the problem is one of finding the correct information. Many techniques for solving this problem are known, including: indexing systems such as Yahoo, graphical electronic malls, hall of malls, directories, and text search engines, such as OpenText. These techniques and tools for searching and retrieving information, in their present form, can inundate the user with large amounts of unwanted material.

This later problem can be alleviated somewhat by enabling the user to provide search statements as a set of criteria which are combined with logical operators, such as 'AND', 'OR' and 'NOT' operators. However, many problems still exist with this. One of them is that the user is left to his/her own imagination to try to think of all the alternative descriptions (i.e. keywords) of a product or service. As search engines and techniques become ever more powerful in the number and diversity of databases they can access, the amount of information which it is possible to present to a user can quickly become excessively large. The problem or opportunity still remains to quickly find the relevant information for which the user is looking.

SUMMARY OF THE INVENTION

It is an object of the present invention to provide a new and improved associative search methodology for retrieving related information.

The invention, therefore, according to a first broad aspect provides a method of providing advertisements to a user searching for desired information within a data network, comprising the steps of: receiving, from the user, a search request including a search argument corresponding to the desired information; searching, based upon the received search argument, a first database having data network related information to generate search results; correlating the received search argument to a particular advertisement in a second database having advertisement related information; and providing the search results together with the particular advertisement to the user.

According to a second broad aspect, the invention provides a method of searching for desired information within a data network, comprising the steps of: receiving, from a user, a search request including a search argument corresponding to the desired information; searching, based upon the received search argument and user profile data, a database of information to generate a search result; and providing the search results to the user.

According to a third broad aspect, the invention provides a system for providing advertisements to a user searching for desired information within a data network, comprising; means for receiving, from the user, a search request including a search argument corresponding to the desired information; means for searching, based upon the received search argument, a first database having data network related information to generate search results; means for correlating the received search argument to a particular advertisement in a second database having advertisement related information; and means for providing the search results together with the particular advertisement to the user.

According to a fourth broad aspect, the invention provides a system for searching for desired information within a data network, comprising: means for receiving, from a user, a search request including a search argument corresponding to the desired information; means for searching, based upon the received search argument and user profile data, a database of information to generate a search result; and means for providing the search results to the user.

Conventional search engines, for example OpenText, provide a basis on which the methodology according to this invention may be implemented. In a particular embodiment, the invention is manifested by an advertising system including an associative search engine that may be tied into and form an integral part of the conventional search engine. When an end user accesses the conventional search engine, the associative engine of the selling system examines the user's choices and search instructions, that have been input by the user, and formulates the necessary strategy and tactics to offer products that would appeal to the end user based on his/her inputs and choices up until that point in the search. Since the process is dynamic the strategy and tactics can be continually refined and the results presented to the end user in a predictive order and fashion that relates to that end user's past preferences (either for the immediate search underway or including all prior search data stored for that user) and a contextual database. This effectively provides unobtrusive, related and useful data and options to the end user who is searching for information. The processor used for the advertising and selling mechanism can be a part of or interconnected with the search engine.

Some examples will illustrate how this invention can have high value to an end user. An end user's profile data may contain such information as the make, model and year of automobile he/she owns or leases. When tires are needed, the manufacturers recommended tire types and options may be considered as sort criteria provided within a contextual database. Another example relates to when airline reservations are being sought. All of a person's preferences, which today are normally sorted one by one through a travel agent, could be utilized by the advertising and selling mechanism to provide the informed response.

In addition to the search criterion, as users interact with the advertising system, it will continue to compile preference data (e.g. a list of keywords) for each user. All preferences, for example, can be left in a type of default mode or even presented to the user for him/her to edit and re-prioritize in order to look for diversity or alternatives. The system can detect exceptions and contradictions so that the end user can be shown immediately that some of the options would violate natural tendencies.

Some of the search patterns or preferences will be keyed off of natural interests also such as: social, family, political, technological, geographical, environmental, educational and so on. Once these preferences are known, then an advertisement or a proposed customized product brochure can be prepared.

This invention is also enhanced by advances in technology occurring in the emerging ubiquitous data world, such as new software languages. One example is "Java". Java is an environment that can be exported to an end users platform to run an application which may include graphics, moving demonstrations, cartoon like explanations or even video. The Java like environment could be used to customize with more than name, it can be used to customize with detailed examples.

One other opportunity presented to service providers is the potential to create new and better ways to improve the environment presented to end users of various classes by remembering what was effective for a sale to occur. In this way, key elements of a presentation or search that have higher success can be put into a higher priority or category for further use and therefore more rapid development through even more intense feedback due to subsequent use.

While this invention can be integrated with traditional Internet search engines (such as Yahoo or Lycos), full advantage can be obtained by integrating the invention with an Internet Access provider. An Internet Access Provider can maintain a more complete user database. Customers are localized, so individual databases will contain fewer users. This allows more database space to be allocated to each user. In addition, more detailed information can be maintained, such as geographical location, type of home computer system, and any additional information the user may choose to provide to the Internet Access Provider.

It is anticipated that the Java environment will develop so that it too will learn and adapt. As a user continues to stop presentations at certain points, scan, re-scan, look for further input at certain points, abort a negotiation and so on at certain points, then such points or logic routines could be avoided or alternatives considered. The present invention proposes such a dynamic and relational preferences methodology in order to more rapidly and more effectively couple a user's needs with product or service offerings.

It is also recognized that these techniques may be applied to an educational environment where, for example, a student may be able to have an environment that is aurally enhanced, another one that is visually enhanced, another one that is textually enhanced and yet another that is anecdotally as opposed to logically enhanced. There are many other opportunities due to different personal proclivities, strengths, skills or disabilities.

BRIEF DESCRIPTION OF THE DRAWINGS

The invention will be better understood from the following detailed description of an advertising machine together with reference to the accompanying drawings, in which.

DETAILED DESCRIPTION OF THE DRAWINGS

Figure 1:
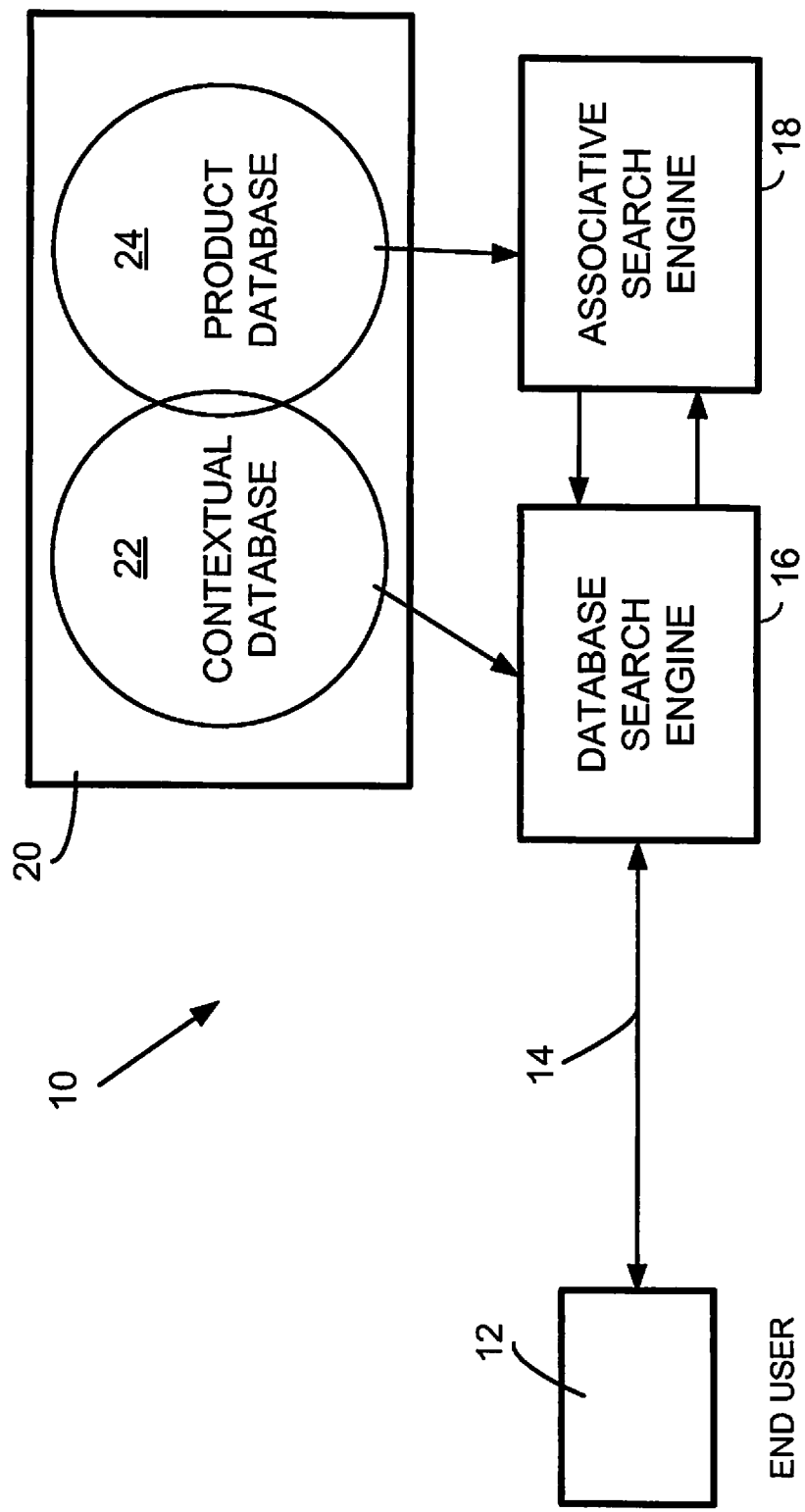
FIG. 1 is a schematic representation of the advertising machine including an associative search engine.

Referring to FIG. 1, shown is an advertising machine, generally referenced by 10, together with a data processing device 12 and a communications link 14 through which the device 12 interacts with the advertising machine 10. The communications link 14 may be provided by a global data network, typically the Internet, and the data processing device 12 may be any conventional hardware/software combination supporting functionality for communications over the Internet. Examples of the data processing device 12 include a personal computer (PC) or Macintosh executing an appropriate browser application, such as, Netscape Navigator which functions as an interface to the World Wide Web (WWW) of the Internet. Functionality provided by the advertising machine 10 may be implemented using an appropriately programmed conventional data processing server platform.

The advertising machine 10, in this particular embodiment, comprises a database search engine 16 and an associative search engine 18 which may access a database 20 having contextual data 22 and product data 24. The database search engine 18 is conventional technology, an example of which is the OpenText engine that provides searches based on subject, strings, boolean, text, etc. Such input search arguments may be received from an end user via the data processing device 12 and data link 14 and, accordingly, the database search engine 16 effects a search of the contextual data 22 in the database 20 and returns results of the search to the end user, as a page displayed on the device 12. The contextual database typically contains information relating to the Internet, for instance, keywords associated with respective WWW site locations.

The associative search engine 18, in accordance with the present invention, may contain rule based software algorithms or non-precise techniques, such as, fuzzy logic that can correlate a search argument derived from the user and changes in the argument during a single session, to particular product data within the product database 24. The associative search engine 18 selects the most logical product from its available data 24 and then provides an advertisement insert that is added to the end user's search page, in an attempt to present the end user with the product that is closest to the need as determined by the associative search engine 18 of the selling machine 10.

In operation, for example, the process effected when an end user at the device 12 accesses the advertising machine 10 is as follows.

1) The end user device 12 sends a search request outlining the search argument to the database search engine 16.

2) The search engine 16, having carried out a traditional search of Internet related information in the contextual data 22, passes the argument and results of the its search to the associative search engine 18 which then looks for a match in the product data 24 of the database 20. The associative search engine 18 may determine a logical product fit to the initial search argument, or it may create a logical tree analysis of possible product fits and selects a probable best product for an advertisement window to be displayed with the search results.

3) The associative engine 18 passes the data of the selected product to the search engine 16 which in turn provides the results of the search against the given argument together with the initial product advertisement to the device 12 for displaying to the end user.

4) The end user refines his or her search by either clicking on a displayed result or refining their search through additional arguments or search criteria.

5) The associative search engine 18 and the database search engine 16 again work together in providing refined data as in (2) above. In the case of the end user clicking on (i.e., selecting) a specific search result, the associative search engine 18 further refines its logical tree strategy and selects the probable best fit product and generates an advertisement.

6) The end user search results advertisement window is continually updated on each selection or refinement using a technology such as Java providing the end user with a continually updated product advertisement that is considered to be most relevant (best fit) at that point in the search. In addition, failure of the end user to click on the advertisement is used as a criterion in the logical tree in providing the appropriate advertisement.

7) Once the end user clicks on (selects) the advertisement displayed on the device 12, an appropriate message is sent to the advertising machine 10 and, in particular, to the associative search engine 18 which may automatically connect the end user to the seller of the product, for instance, by forwarding the browser of the end user device 12 to the WWW site address of the seller. In the product data 24 for this seller, the associative search engine may record that this transaction occurred, in order that a toll for bringing a buyer and seller together may be extracted.

Moreover, user profile data may be maintained on end user device 12 and accessed by the associative search engine 18. The profile data contains, for example, end user preferences and previous search arguments which may be used to augment the individual search arguments received with the search request to select a best fit product advertisement. The associative search engine 18 retrieves and updates the profile data on the device 12, using appropriate messages exchanged over the communications link 14. For example, the search arguments from the current search session may be added to the user profile data.

Figure 2:
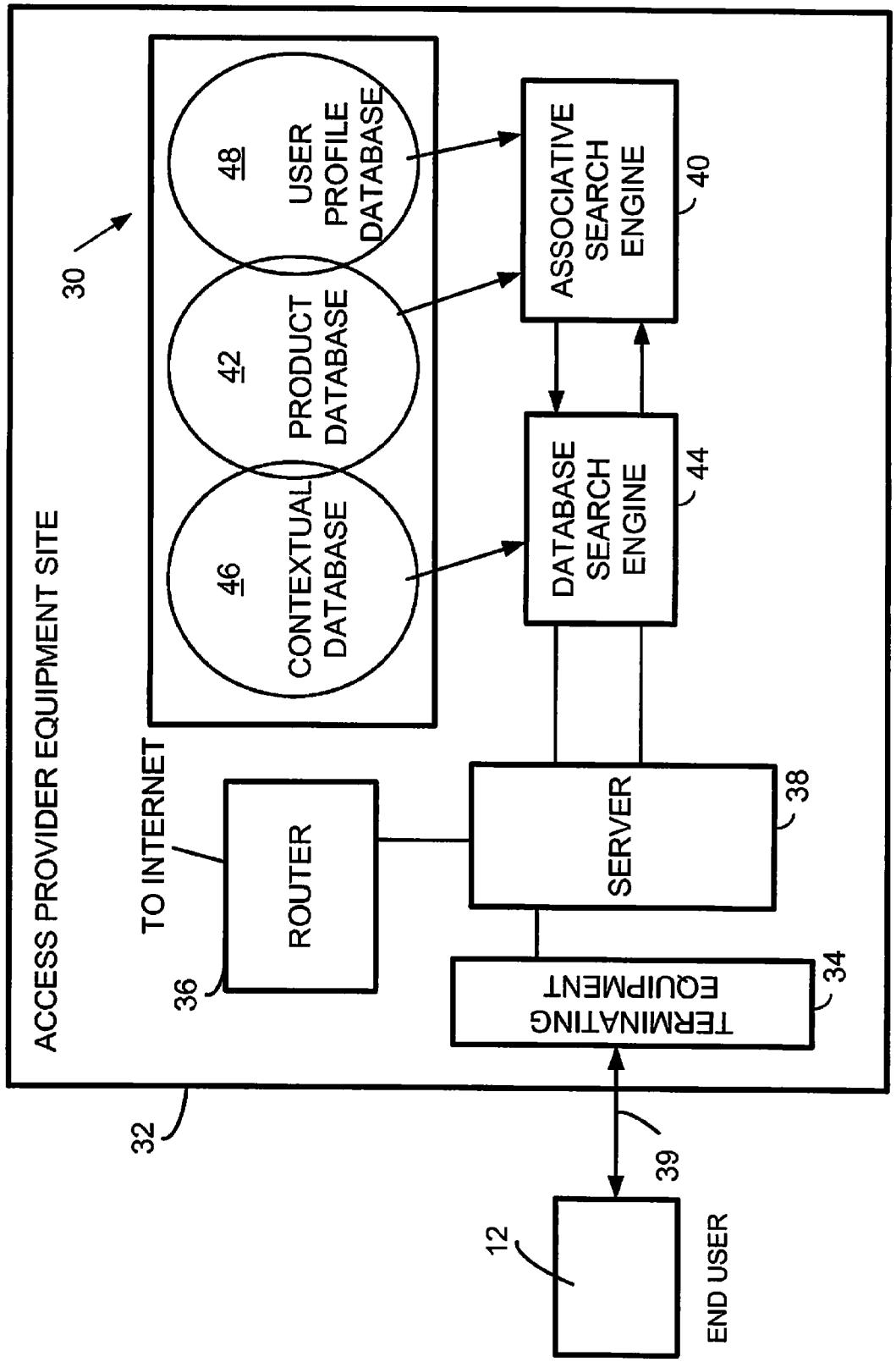
FIG. 2 is a schematic representation of the advertising machine in combination with an Internet Access Service provider.

Turning to the system illustrated in FIG. 2, the advertising machine 30 (similar to the machine 10 in FIG. 1) is integrated as part of the functionality embodied at an Internet access provider equipment site 32 which typically includes a telephone network terminating equipment 34, a router 36 through which TCP/IP packets are transmitted to and received from the Internet, and a server 38 which in general controls operation and couples data calls terminated by equipment 34 to router 36. The link 39 represents a data call established through the telephone network to the access provider site 32.

The associative search engine 40 of machine 30 contains software algorithms or non-precise techniques, such as, fuzzy logic that correlates a search argument derived from the user and changes in the argument during a single session with the product database 42 whereby the most logical product from its available list may be selected. It then provides an advertisement insert that is added to the end user's search page in an attempt to offer the end user with the product that is closest to the need as determined by the associative search engine 40.

The access provider site 32, incorporating the advertising machine 30, is the sole channel available to the end user for accessing the Internet. When an end user carries out a search using the search engine 44 and clicks on (selects) a specific result or chooses an alternate information site address, the information is passed to the associative search engine 40 of that access provider 32. Thus, not only the page with the search results but also the home page of the access provider can be updated with the appropriate advertisement which is selected by the associative search engine 40 from the product database 42. In addition, since the data processing device 12 of the end user is connected through the access provider site 32 for all destinations within the Internet, a comprehensive user profile database 48 may be maintained by the associative search engine 40, about the end users preferences and previous search arguments which may be used to augment the individual search argument received with the search request to select a best fit product advertisement.

In operation, for example, the process effected when an end user at the device 12 accesses the Internet through access provider site 32 is as follows.

1) The end users access the search engine 44, provided as a basic service by the access provider, and requests a search outlining the search argument.

2) The search engine 44 passes the argument and results of its search in database 46 to the associative search engine 40 which looks for a match in the product database 42 determining a logical product fit to the initial search argument. The associative search engine 40 creates a logical tree analysis of possible product fits, and selects or creates a probable best product advertisement for the advertisement window on the search results. In this case, the associative search engine 40 also can utilize the maintained profile on the end user from past search sessions and/or historical data gathered on their buying habits, in the product selection processing. The associative search engine correlates the user's identity to data in the user profile database 48 which it maintains and updates with data (e.g., search argument received with search request) from the current search session.

3) The search engine 44 provides the end user with the results of the search against the given argument including the initial product advertisement from the associative search engine 40. The results and advertisement are displayed by end user device 12.

4) The end user refines his/her search by either clicking on a result, or refining their search through additional arguments or search criteria.

5) The associative search engine 40 and the database search engine 44 again work together in providing refined data as in (2) above. In the case of the end user clicking on (selecting) a specific search result the associative search engine 40 further refines its logical tree strategy and selects the probable best fit product and generates an advertisement.

6) The end user device 12 search results advertisement window is continually updated on each selection or refinement using a technology such as Java, providing the end user with a continually updated product advertisement that is considered to be most relevant (best fit) at that point in the search. In addition, failure of the end user to click on the advertisement is used as a criterion in the logical tree in providing the appropriate advertisement. The access provider's home page sent to the end user can also contain a specialized advertisement constructed from the end user's profile data (e.g., searches and/or buying habits).

7) Once the end user is led to click on the advertisement, the associative search engine 40 of the selling machine 30 takes control and connects the potential buyer to the WWW site of the seller of the product, thereby exacting a toll for the transaction of bringing a buyer and seller together.

Those skilled in the art will recognize that various modifications and changes could be made to the invention without departing from the spirit and scope thereof. It should therefore be understood that the claims are not to be considered as being limited to the precise embodiments of the selling machine set forth above, in the absence of specific limitations directed to each embodiment.

The invention claimed is:
1. A method of providing search results and advertisements to a user, the method comprising:
associating user preferences with the user;
receiving a search request from the user;

searching at least one database based on the search request and the user preferences to produce at least one search result;

selecting at least one advertisement from an advertisement database based on the user preferences and the search request;

providing the at least one search result and the at least one advertisement to the user;

modifying the user preferences associated with the user based on the search request;

receiving search refinement input from the user;

producing at least one modified search result based on at least the search refinement input;

updating the at least one advertisement selected from the advertisement database based at least in part on the modified user preferences and the search refinement input; and providing at least one of the at least one modified search result and the updated at least one advertisement to the user.

2. The method of claim 1, wherein producing the at least one modified search result comprises producing the at least one modified search result based at least in part on the modified user preferences.

3. The method of claim 1, further comprising modifying the user preferences associated with the user based on the search refinement input.

4. The method of claim 3, wherein producing the at least one modified search result comprises producing the at least one modified search result based at least in part on the modified user preferences.

5. The method of claim 1, wherein the search request comprises at least one search argument and the search refinement input comprises at least one additional search argument.

6. The method of claim 1, wherein the user preferences comprise prior purchasing information associated with the user.

7. The method of claim 1, wherein the user preferences comprise information based on prior searching history associated with the user.

8. The method of claim 1, wherein the user preferences comprise information based on interests associated with the user, the interests being at least one of social interests, family interests, political interests, technological interests, geographical interests, environmental interests, and educational interests.

9. The method of claim 1, wherein the user preferences are captured in a user profile.

10. The method of claim 1, wherein associating the user preferences with the user comprises storing the user preferences.

11. The method of claim 1, wherein the user preferences associated with the user are stored on a device associated with the user.

12. The method of claim 1, wherein updating the at least one advertisement selected from the advertisement database from the advertisement database based on the user preferences and the search refinement input comprises processing at least one of user preference information, a search argument, and the search refinement input using at least one rule-based algorithm to update the at, least one advertisement.

13. The method of claim 1, wherein updating the at least one advertisement selected from the advertisement database based on the user preferences and the search refinement input comprises applying at least one non-precise technique to at least one of user preference information, a search argument, and the search refinement input using at least one rule-based algorithm to update the at least one selected advertisement.

14. The method of claim 13, wherein the at least one non-precise technique comprises application of fuzzy logic.

15. The method of claim 1, comprising customizing, based on the user preferences, at least one of the at least one modified search result and the updated at least one advertisement for receipt by the user.

16. The method of claim 15, wherein customizing, based on the user preferences, the at least one of the at least one modified search result and the updated at least one advertisement comprises at least one of aurally enhancing the at least one of the at least one modified search result and the updated at least one advertisement, visually enhancing the at least one of the at least one modified search result and the updated at least one advertisement, textually enhancing the at least one of the at least one modified search result and the updated at least one advertisement, anecdotally enhancing the at least one of the at least one modified search result and the updated at least one advertisement, and logically enhancing the at least one of the at least one modified search result and the updated at least one advertisement.

17. The method of claim 1, wherein updating the at least one advertisement selected from the advertisement database based on the user preferences and the search refinement input comprises selecting at least one other advertisement from the advertisement database for provision to the user.

18. A method of providing search results and advertisements to a user, the method comprising:

associating user preferences with the user;

receiving a search request from the user;

searching at least one database based on the search request and the user preferences to produce at least one search result;

selecting at least one advertisement from an advertisement database based on user preferences and the search request;

providing the at least one search result and the at east one advertisement to the user;

receiving search refinement input from the user;

modifying the user preferences associated with the user based on the search refinement input;

producing at least one modified search result based on at least the search refinement input;

updating the at least one advertisement selected from the advertisement database based at least in part on the modified user preferences and the search refinement input; and providing at least one of the at least one modified search result and the updated at least one advertisement to the user.

19. A method of providing search results and advertisements to a user, the method comprising:

associating user preferences with the user;

receiving a search request from the user;

searching at least one database based on the search request and the user preferences to produce at least one search result;

selecting at least one advertisement from an advertisement database based on the user preferences and the search request;

providing the at least one search result and the at least one advertisement to the user;

receiving search refinement input from the user based on selection by the user of at least one of the at least one search result and the at least one advertisement provided to the user;

producing at least one modified search result based on at least the search refinement input;

updating the at least one advertisement selected from the advertisement database based on the user preferences and the search refinement input; and providing at least one of the at least one modified search result and the updated at least one advertisement to the user.

* * * * *

UNITED STATES PATENT AND TRADEMARK OFFICE
CERTIFICATE OF CORRECTION

PATENT NO.        : 8,645,351 B2                                      Page 1 of 1
APPLICATION NO.   : 13/724147
DATED             : February 4, 2014
INVENTOR(S)       : Richard Prescott Skillen It is certified that error appears in the above-identified patent and that said Letters Patent is hereby corrected as shown below:

In the Claims

Column 7, lines 55-62, in claim 12 replace:

"The method of claim 4, wherein updating the at least one advertisement selected from the advertisement database from the advertisement database based on the user preferences and the search refinement input comprises processing at least one of user preference information, a search argument, and the search refinement input using at least one rule-based algorithm to update the at least one advertisement." with --"The method of claim 4, wherein updating the at least one advertisement selected from the advertisement database based on the user preferences and the search refinement input comprises processing at least one of user preference information, a search argument, and the search refinement input using at least one rule-based algorithm to update the at least one advertisement."--

Signed and Sealed this
Twenty-second Day of April, 2014

Michelle K. Lee
*Deputy Director of the United States Patent and Trademark Office*